July 19, 1932.  W. J. RICHARDS  1,867,592

INDEXING ATTACHMENT FOR AUTOMATIC MACHINES

Filed Jan. 16, 1931  2 Sheets-Sheet 1

Inventor
William J. Richards
By his Attorney

July 19, 1932.                W. J. RICHARDS                1,867,592
                INDEXING ATTACHMENT FOR AUTOMATIC MACHINES
                Filed Jan. 16, 1931        2 Sheets-Sheet 2
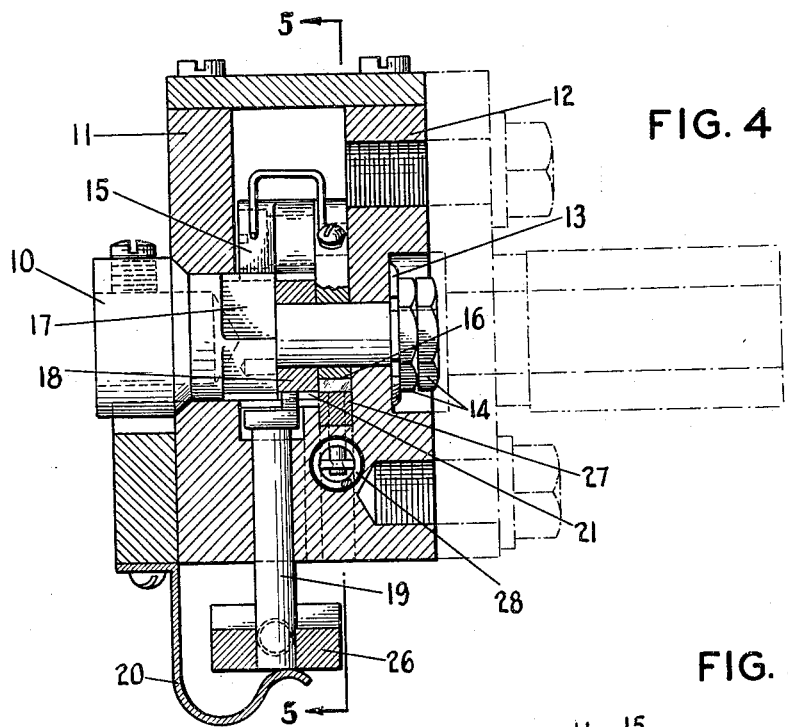
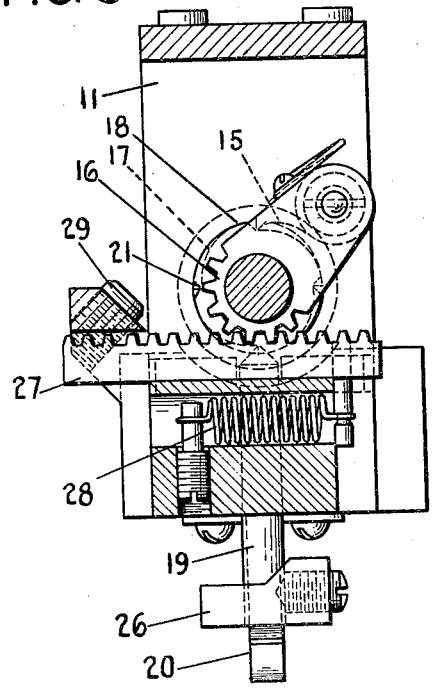
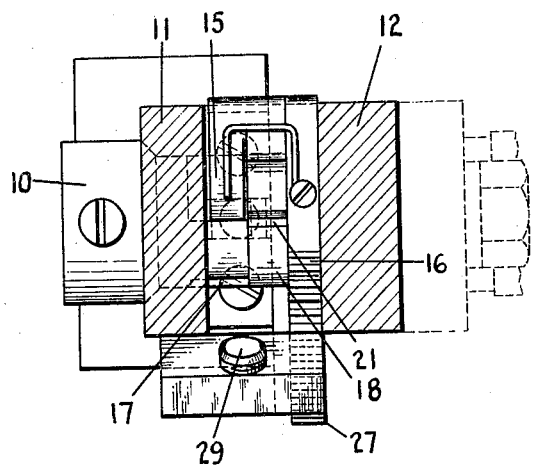
Inventor
William J. Richards Patented July 19, 1932

1,867,592

UNITED STATES PATENT OFFICE

WILLIAM J. RICHARDS, OF WATERBURY, CONNECTICUT, ASSIGNOR TO THE BRISTOL COMPANY, OF WATERBURY, CONNECTICUT, A CORPORATION OF CONNECTICUT

INDEXING ATTACHMENT FOR AUTOMATIC MACHINES

Application filed January 16, 1931. Serial No. 509,051.

The invention relates to the operation of automatic machines, more particularly of the automatic lathe or screw type wherein various operations are automatically and successively performed on work held in a suitable head or chuck, certain tools being periodically presented to the work for operation thereon.

The invention has for its object an attachment for such machines whereby a tool presented for operation on the work may be suitably indexed as, for example, for permitting a plurality of broaching operations to be performed.

In carrying out the invention, a specially designed tool-holder is arranged to be mounted in the usual turret device provided in connection with automatic lathe or screw machines, and the said tool-holder coacts with means actuated from a timed moving element of the machine to effect the indexing of a tool retained by said holder. For example, such actuating means may be operated from the cam shaft of the machine and presented by its forward cross-slide.

The nature of the invention, however, will be best understood when described in connection with the accompanying drawings, in which:

Fig. 3 is an enlarged horizontal section taken on the line 3—3, Fig. 1 of the drawings, and looking in the direction of the arrows.

Fig. 4 is a vertical section, on an enlarged scale, taken on the line 4—4, Fig. 1 of the drawings.

Fig. 5 is a transverse section taken on the line 5—5, Fig. 4 of the drawings, and looking in the direction of the arrows.

Figures 1, 2:
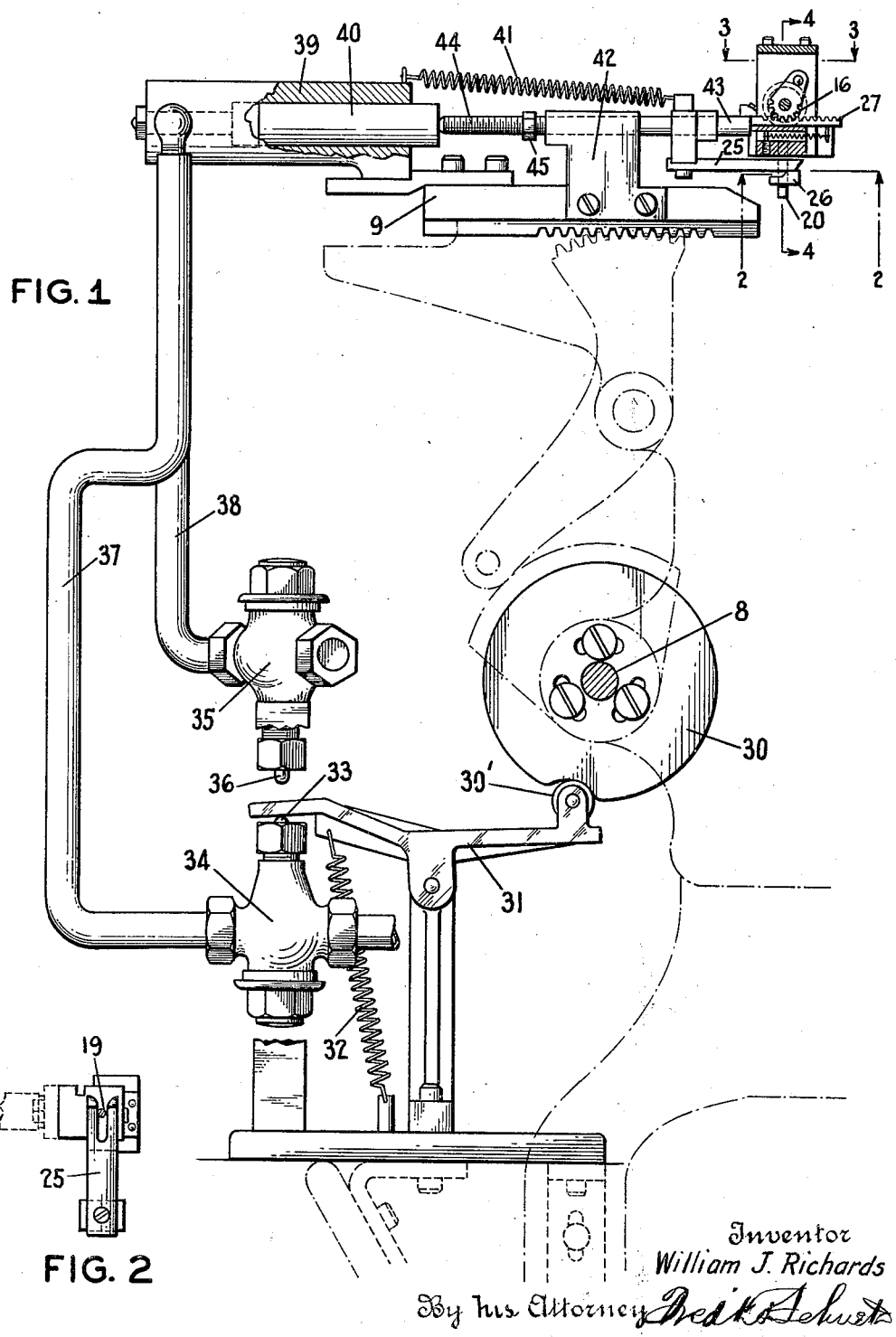
Fig. 1 is an end elevation and part vertical section of the novel attachment, a portion of the frame of the machine and the cross-slide actuating mechanism being indicated in phantom lines.
Fig. 2 is a fragmentary cross-section, taken on the line 2—2, Fig. 1, and illustrates unlocking mechanism for the indexing element.

Referring to the drawings, 8 designates the cam shaft of an automatic lathe or screw machine and from which is driven in well-known manner also the forward cross-slide 9 of the machine, the remaining mechanism and devices being similar to those found in the usual automatic machines of this type and are not shown. It is to be understood, however, that the machine embodies these devices and operates in the conventional manner.

In accordance with the invention, a broaching tool holder is provided in the form of a rotatable shaft 10 which is counter-bored to receive a suitable broaching or other tool (not shown), and normally retained in fixed position against angular movement by means hereinafter more fully set forth.

The said holder 10 is to this end mounted in the wall 11 of a suitable supporting body to whose opposite wall 12 is to be coaxially secured a spindle (indicated by the phantom lines) for fitting the tool-holder to a suitable support as the usual turret member of the lathe (not shown). The said holder may conveniently be held in the body member by means of a spring washer 13 and lock nuts 14 fitted about its inner end.

Intermittent rotational movement is arranged to be imparted to the holder 10 through a spring-pressed pawl 15, which is carried by an arm having gear teeth 16 for rotation, the pawl engaging a ratchet 17 integral with or rigidly secured to the holder 10. A stop wheel 18, furthermore, is rigidly secured to the said holder 10 and is designed normally to be locked by a locking pin 19 which is reciprocably mounted in the body portion and is spring-urged inwardly by a spring 20 toward notches 21 cut into the said wheel for securely holding the tool-holder 10 in predetermined angular positions. The number of notches provided in the locking wheel corresponds to the number of indexing positions to which the holder is to be set.

Provision is made for withdrawing this locking pin 19 at predetermined intervals, in order to permit the pawl to advance the tool-holder 10, as by means of a wedging bar 25 engaging a cam 26 secured to the outer end of said pin and upon which the spring 20 bears to force the pin inwardly. When pin 19 is thus released to free the stop wheel 18, movement is imparted to a rack 27 engaging the gear teeth 16 to impart angular movement to the arm for actuating pawl 15 to advance the tool-holder by engagement with its ratchet teeth and over the required angular distance. When the actuating force for the rack is withdrawn, a spring 28 returns the rack to its normal position and thereby oppositely rotates the gear arm for returning also the pawl to its normal position. An adjustable stop 29 may be provided on the body portion to limit the throw of the pawl through engagement of the latter therewith.

The actuating movement for the rack, as well as the introduction of the wedging bar 25 for releasing the locking pin 19, may be obtained from the cam shaft 8, it being understood that the motion of the cross-slide 9 and cam shaft are suitably timed to effect the desired operations. For example, the shaft 8 carries a cam 30 adapted to engage with a roller 30' mounted upon one end of a lever 31 which is pivoted to the machine frame, and is also spring-drawn by means of a spring 32 to cause its one arm to be engaged normally with the piston rod or stem 33 of a valve 34 controlling the supply of an actuating fluid medium such as air. This valve is designed to be opened when its stem 33 is pushed inwardly by the lever 31, as indicated in Fig. 1 of the drawings; and a similar valve 35 is mounted opposite the valve 34 and has an outwardly projecting piston rod or stem 36, coaxial with the stem 33, and designed to be engaged when the lever is oppositely thrown to open thereby said valve 35.

The said lever 31, furthermore, is positioned with its free end pushing inwardly either the stem 33 or the stem 36 in accordance with the action of the cam 30 upon the roller 30', as will readily be understood; and the aforesaid valves 34 and 35 are connected through suitable hose connections 37 and 38 with a cylinder 39. The latter contains a piston 40 reciprocable therein and normally urged inwardly through the action of a spring 41. The cylinder 40 and a supporting bearing 42, moreover, are carried by the cross-slide 9, said bearing 42 mounting also a reciprocable rod 43 to which is attached one end of the spring 41 whose other end is secured to the wall of cylinder 39.

To the rod 43 is also secured the wedging bar 25 so as to be movable therewith; and this rod is bifurcated at its outer end as shown more clearly in Fig. 2 of the drawings, the tines thereof embracing the locking pin 19 and being adapted to engage the cam 26 as rod 43 is forced outwardly. This is accomplished through the action of piston 40 whose outer end is arranged to engage with the screw-threaded end 44 of said rod 43. An adjustable stop nut 45 is provided on the said threaded end 44 to limit the outward movement of rod 43 in its bearing 42; and the outer end of this rod is adapted to engage also with the projecting end of the rack 27 to impart the movement thereto required for operating the pawl, as hereinbefore set forth.

Movement of piston 40 may be effected in any suitable manner by a suitable fluid medium such as air under pressure, introduced through the tube 37 when valve 34 is opened, and retracted when valve 35 is opened to exhaust said cylinder, spring 41 effecting the return of the said piston.

The operation of indexing the rotatable tool-retaining element or holder 10 will occur whenever cam shaft 8 rotates and disengages thereby roller 30' from its notch to cause the roller to ride upon the high surface of the cam 30. This will operate valve 35 by pushing in its stem 36 under the action of lever 31 and will thereby cause fluid to be supplied to the cylinder 39 to advance to plunger 40. The wedging bar 25 is simultaneously moved therewith and engages cam 26 to release the locking pin 19 so that as rack 27 is advanced through the continued movement of plunger 40, arm 16 with its spring-pressed pawl 15 will be swung accordingly and the tool holder advanced angularly the predetermined amount.

Upon further rotation of the cam shaft 8 roller 30' will again drop into its notch of the cam 30, releasing stem 36 and shutting off the fluid pressure to the cylinder 39, which cylinder is also exhausted simultaneously therewith by the pressing in of stem 33 of valve 34 under action of lever 31. Rack 27 is retracted under action of spring 41 upon plunger 40, thus restoring the various parts to their normal positions. It will be understood, of course, that the timing of the cam shaft 8 is in accordance with the desired indexing and other operations of the machine.

I claim:

1. In an automatic machine of the nature set forth: a tool-holder adapted to be mounted in the turret of said machine and embodying a rotatable tool-retaining element carried by the turret, and means to index said element about its rotational axis and relatively to the turret.

2. In an automatic machine of the nature set forth and including a cam shaft: a tool-holder adapted to be mounted in the turret of said machine and embodying a rotatable tool-retaining element, carried by the turret, and means timed to the movement of the cam shaft of the machine to index said element about its rotational axis and relatively to the turret.

3. In an automatic machine of the nature set forth and including a cam shaft: a holder adapted to be mounted in the turret of said machine, a tool-retaining element rotatably mounted in the holder, indexing means for the said element including pawl and ratchet mechanism, the latter being rotatable with the tool-retaining element, a locking wheel secured to the said element, means to actuate the pawl for advancing the tool-retaining element a predetermined distance, and means actuated from the cam shaft of the machine for engaging with said pawl-actuating means 4. In an automatic machine of the nature set forth and including a cam shaft: a holder adapted to be mounted in the turret of said machine, a tool-retaining element rotatably mounted in the holder, indexing means for the said element including pawl and ratchet mechanism, the latter being rotatable with the tool-retaining element, a locking wheel secured to the said element, means to actuate the pawl for advancing the tool-retaining element a predetermined angular distance, means actuated from the cam shaft of the machine for engaging with said pawl-actuating means, and means movable therewith for disengaging the locking pin from its locking wheel.

5. In an automatic machine of the nature set forth and including a cam shaft: a holder adapted to be mounted in the turret of said machine, a tool-retaining element rotatably mounted in the holder, indexing means for the said element including pawl and ratchet mechanism, the latter being rotatable with the tool-retaining element, a locking wheel secured to the said element, means to actuate the pawl for advancing the tool-retaining element a predetermined angular distance, means actuated from the cam shaft of the machine for engaging with said pawl-actuating means, and spring-drawn means movable therewith for disengaging the locking pin from its locking wheel.

6. In an automatic machine of the nature set forth and including a cam shaft: a holder adapted to be mounted in the turret of said machine, a tool-retaining element rotatably mounted in the holder, indexing means for the said element including pawl and ratchet mechanism, the latter being rotatable with the tool-retaining element, a locking wheel secured to the said element, means to actuate the pawl for advancing the tool-retaining element a predetermined distance, and fluid-actuated means for controlling the movement of said pawl-actuating means.

7. In an automatic machine of the nature set forth and including a cam shaft: a holder adapted to be mounted in the turret of said machine, a tool-retaining element rotatably mounted in the holder, indexing means for the said element including pawl and ratchet mechanism, the latter being rotatable with the tool-retaining element, a locking wheel secured to the said element, means to actuate the pawl for advancing the tool-retaining element a predetermined distance, fluid-actuated means for controlling the movement of said pawl-actuating means, and means actuated from the cam shaft of the machine for controlling said fluid-actuated means.

8. In an automatic machine of the nature set forth and including a cam shaft and cross-slide: a holder adapted to be mounted in the turret of said machine, a tool-retaining element rotatably mounted in the holder, indexing means for the said element including pawl and ratchet mechanism, the latter being rotatable with the tool-retaining element, a locking wheel secured to the said element, means to actuate the pawl for advancing the tool-retaining element a predetermined distance, and means movable with the cross-slide of the machine for engaging said pawl-actuating means.

In testimony whereof I affix my signature.

WILLIAM J. RICHARDS.